(12) United States Patent
Salesse-Lavergne

(10) Patent No.: US 11,453,512 B2
(45) Date of Patent: Sep. 27, 2022

(54) SYSTEM AND A METHOD FOR ASSISTING LANDING AN AIRCRAFT, AND A CORRESPONDING AIRCRAFT

(71) Applicant: AIRBUS HELICOPTERS, Marignane (FR)

(72) Inventor: Marc Salesse-Lavergne, Allauch (FR)

(73) Assignee: AIRBUS HELICOPTERS, Marignane (FR)

( * ) Notice: Subject to any disclaimer, the term of this patent is extended or adjusted under 35 U.S.C. 154(b) by 875 days.

(21) Appl. No.: 15/891,837

(22) Filed: Feb. 8, 2018

(65) Prior Publication Data

US 2018/0222602 A1    Aug. 9, 2018

(30) Foreign Application Priority Data

Feb. 8, 2017  (FR) ........................... 1700134

(51) Int. Cl.
| | |
|---|---|
| B64D 45/08 | (2006.01) |
| G05D 1/12 | (2006.01) |
| B64C 27/57 | (2006.01) |
| H04N 7/18 | (2006.01) |
| G06T 7/73 | (2017.01) |
| G05D 1/06 | (2006.01) |

(Continued)

(52) U.S. Cl.
CPC .............. *B64D 45/08* (2013.01); *B64C 27/57* (2013.01); *G05D 1/0684* (2013.01); *G05D 1/12* (2013.01); *G06T 7/74* (2017.01); *G06V 20/176* (2022.01); *G08G 5/0021* (2013.01); *G08G 5/025* (2013.01); *H04N 7/181* (2013.01); *G01C 21/165* (2013.01); *G01C 23/005* (2013.01); *G06T 2207/10032* (2013.01); *G06T 2207/20221* (2013.01)

(58) Field of Classification Search
None
See application file for complete search history.

(56) References Cited

U.S. PATENT DOCUMENTS

| 4,618,989 A | 10/1986 | Tsukune et al. | |
|---|---|---|---|
| 2010/0039294 A1* | 2/2010 | Feyereisen | G06K 9/0063 340/972 |

(Continued)

FOREIGN PATENT DOCUMENTS

| EP | 2996009 A1 | 3/2016 |
|---|---|---|
| FR | 3053821 A1 | 1/2018 |
| WO | 2014169354 A1 | 10/2014 |

OTHER PUBLICATIONS

French Search Report for French Application No. FR 1700134, Completed by the French Patent Office, dated Oct. 13, 2017, 6 pages.

(Continued)

*Primary Examiner* — Hunter B Lonsberry
*Assistant Examiner* — Matthew J. Reda
(74) *Attorney, Agent, or Firm* — Brooks Kushman P.C.

(57) ABSTRACT

A method that recommends capturing a stream of images of the landing zone, using a first imaging system to calculate position information for the landing zone on the basis of at least one real image of the stream, using an autopilot system to determine a current position of the landing zone at the current calculation instant, using a second imaging system to verify the presence of a landing zone at the current position in the real image, and generating an alarm if the presence is not found.

20 Claims, 3 Drawing Sheets

(51) Int. Cl.
    *G08G 5/02*           (2006.01)
    *G08G 5/00*           (2006.01)
    *G06V 20/10*         (2022.01)
    *G01C 23/00*         (2006.01)
    *G01C 21/16*         (2006.01)

(56) References Cited

U.S. PATENT DOCUMENTS

| | | | |
|---|---|---|---|
| 2010/0321488 A1 | 12/2010 | Soler | |
| 2016/0093225 A1* | 3/2016 | Williams | G01S 5/16 |
| | | | 701/17 |
| 2016/0378121 A1 | 12/2016 | Shue | |
| 2017/0235018 A1* | 8/2017 | Foster | G01V 99/005 |
| | | | 702/5 |
| 2017/0320589 A1* | 11/2017 | Moravek | B64D 45/00 |
| 2018/0009546 A1* | 1/2018 | Filias | B64C 13/18 |
| 2018/0047294 A1* | 2/2018 | Esposito | G08G 5/0091 |

OTHER PUBLICATIONS

"A Fast Ellipse Detector Using Projective Invariant Pruning" by Jia, Fan et al., 1608.07470v1, Aug. 26, 2016, 13 pages.

"Soccer field detection in video images using color and spatial coherence", Image and Video Processing and Analysis, Arnaud Le Troter, Sebastien Mavromatis, and Jean Sequeira, LSIS Laboratory, Oct. 2004, France, 9 pages.

\* cited by examiner

SYSTEM AND A METHOD FOR ASSISTING LANDING AN AIRCRAFT, AND A CORRESPONDING AIRCRAFT

CROSS-REFERENCE TO RELATED APPLICATIONS

This application claims priority to French patent application No. FR 1700134 filed on Feb. 8, 2017, the disclosure of which is incorporated in its entirety by reference herein.

BACKGROUND OF THE INVENTION

(1) Field of the Invention

The present invention relates to the field of systems for assisting piloting, and in particular assisting landing rotorcraft, and to associated piloting assistance methods. Such devices serve to facilitate guiding a rotorcraft during an approach stage in order to land on a landing zone for rotorcraft, such as in particular a helicopter airstrip, a heliport, or a helipad.

2) Description of Related Art

Specifically, the crew of the rotorcraft may have difficulty in identifying the required landing zone, e.g. when said landing zone is placed on a structure at sea, possibly a moving vessel. Such a structure may in particular be in the form of a vehicle such as a ship, a barge, or a platform having a plurality of distinct landing zones.

Identifying such a landing zone can be found to be even more complicated when the landing zone is situated within a set of several structures or platforms that are geographically close to one another.

Furthermore, a landing zone may sometimes be located within an environment that is cluttered and/or it may present small dimensions.

For example, a landing zone on an offshore drilling installation is sometimes small in size. Furthermore, such a landing zone may be in the proximity of obstacles, such as cranes or other metal structures.

In order to facilitate landing on such a landing zone, an aircraft may include a system for assisting piloting by guiding the aircraft towards the intended landing zone.

Devices for automating a landing manoeuvre can require knowledge of the location of the landing zone with accuracy of meter order. However, it can sometimes be difficult to obtain such location accuracy. By way of illustration, an oil platform may sometimes be movable, which can lead to uncertainty about its position that is relatively large, for example of the order of several tens of meters or even hundreds of meters.

The patent application filed in France on Jul. 11, 2016 under the number 16/01075 describes a device for assisting piloting a rotorcraft in order to guide a rotorcraft during an approach stage so as to land on a rotorcraft landing zone, such as a helicopter airstrip. That device includes in particular a camera for taking a plurality of images of the surroundings of the rotorcraft on a line of sight, and processor means for identifying, in at least one image, at least one looked-for landing zone.

A method performed by that device includes a pre-selection step for pre-selecting a type of landing zone, and acquisition step for taking a plurality of images of the surroundings of the rotorcraft, a processing step for identifying in at least one image at least one looked-for landing zone corresponding to the type of landing zone pre-selected during the pre-selection step, at least one display step for at least displaying an image representative of said at least one looked-for landing zone, at least one selection step for at least selecting a desired landing zone from among said at least one looked-for landing zone, and at least one control step for at least generating a control setpoint enabling said rotorcraft to be piloted automatically towards said desired landing zone.

Documents WO 2014/169354, US 2010/321488, and US 2016/378121 are also known.

BRIEF SUMMARY OF THE INVENTION

An object of the present invention is thus to propose an alternative method and device that present an advantageous level of safety.

The invention thus provides a piloting assistance method for facilitating landing an aircraft on a landing zone, the method including a selection step for selecting the landing zone on which the aircraft is to land. The method comprises the following steps:

activating a guidance mode of the autopilot system in order to guide the aircraft automatically towards the landing zone during an approach;

capturing a stream of images of the landing zone with a video acquisition system comprising at least one camera, and transmitting said stream of images to a first imaging system and to a second imaging system, said stream of images including a real image of the landing zone at a current calculation instant;

using the first imaging system to calculate position information for the landing zone on the basis at least of said real image, said position information defining a relative position of the landing zone relative to the aircraft, and transmitting said position information to the autopilot system;

using the autopilot system to determine:
  a current position of the landing zone at the current calculation instant by injecting said position information into a Kalman filter estimator;
  a target position of the landing zone that is to be reached by the landing zone when the aircraft lands on the landing zone, with this target position being determined using said estimator; and
  a consolidated path leading to the target position of the landing zone as a function of at least one stored approach model;

transmitting at least the current position and the consolidated path to the second imaging system;

using the second imaging system to verify that a landing zone is present at said current position in the real image; generating an alarm if such presence is not found; and using a first display to display a real image and a first symbol positioned at said current position for visual comparison by a pilot.

The term "real image" designates the portion of an image of the image stream captured at a calculation instant that contains the landing zone.

The term "landing zone" designates an area for landing on. Such an area may possibly be marked with a circle, which looks like an ellipse when seen from the aircraft, together with a letter H.

The position information makes it possible to evaluate the position of the landing zone, i.e. a geometrical center of the landing zone, for example.

In this method, a landing zone is selected and an autopilot system directs the aircraft towards the selected landing zone along the consolidated path. The consolidated path that is followed may be a path that can be corrected manually by a pilot.

In parallel, a video acquisition system acquires an image stream that is transmitted to a first imaging system and to a second imaging system, both of which are conventional.

An imaging system may comprise a processor card that performs "simple" and massive processing on the image stream (detecting dead pixels, separating red, green, and blue, changing color code, detecting energies on a grayscale version of the image, etc. . . . ) followed by two independent stages dedicated to specific processing.

These two independent stages represent the first imaging system and the second imaging system. For example, each of the first imaging system and the second imaging system may be in the form of a graphics card. The first imaging system and the second imaging system are independent, each of them communicating with the processor card, thereby making it possible to install dissimilar processing and to make use of this dissimilarity to avoid the presence of undetected common mode failures.

The processor card and also the first imaging system and the second imaging system may optionally form parts of a single piece of equipment. The first imaging system uses an image analysis method to determine the position of the target landing zone, relative to the aircraft. For example, this position may be expressed in the form of position information comprising a bearing angle and an elevation angle for the landing zone relative to the aircraft, together with a straight line distance between the landing zone and the aircraft.

For example, one known method consists in preparing this data as a function of the characteristics of the shape of an ellipse and of an H in the landing zone as seen from the aircraft.

For example, one image analysis method is of the type described in the article "A Fast Ellipse Detector Using Projective Invariant Pruning" by Jia, Fan et al.

The advantage of a device based on imaging for positioning the landing zone relative to the aircraft is that it makes it possible to obtain a calculated position that is sufficiently accurate without any need to have recourse to expensive instrumentation.

The position information is continuously transmitted to the autopilot system in order to be consolidated by a conventional Kalman filter estimator. Such an estimator is known to the person skilled in the art and serves to estimate the current position of the landing zone from a cloud of points transmitted by the first imaging system. In the event of the first imaging system failing or in the event of the above-mentioned alarm being generated, the Kalman filter enables the autopilot system to predict the current position.

Furthermore, the autopilot system determines a "target" position at which the landing zone is going to be found at the time of landing as such.

If the landing zone is stationary, the target position may be aligned with the current position. In contrast, if the landing zone is moving, e.g. because it is on board a moving vessel, then the autopilot system takes account of the estimate of its current position, of its speed, and possibly also of a profile for causing the aircraft to hover, in order to predict where the landing zone is going to be found at the time of its rendezvous with the aircraft.

Under such circumstances, the autopilot system updates the consolidated path to be followed in order to land on the landing zone positioned at the target position. The consolidated path is prepared using an approach model that provides the characteristics of the path to be followed. For example, the consolidated path needs to include a level segment, followed by a rounded parabolic start-of-descent curve, followed by a descent along a segment presenting a small slope, and then a final rounded parabolic curve. The model may also impose small and predefined roll-angle and acceleration values.

The consolidated path is then followed by the aircraft automatically under the control of the autopilot system, e.g. by applying a known automatic guidance mode. Nevertheless, the pilot may naturally control the aircraft manually, should that be necessary.

The current position and the consolidated path are also transmitted to the second imaging system. For example, the consolidated path is compressed by the autopilot system and then decompressed by the second imaging system.

After decompressing the received consolidated path, the second imaging system can prepare a series of synthesized images for showing a synthesized representation of the consolidated path that is to be followed by the aircraft superposed on the current image, e.g. in the form of "tracer bullets".

The second imaging system also determines whether a landing zone is to be found at the current position in the real image.

If not, an alarm is issued. The term "alarm" refers to an alarm that may be textual, visual, audible, or even tactile, informing the pilot of a potential malfunction. By way of example, the alarm represents a confidence index transmitted to the autopilot system.

Furthermore, the second imaging system superposes a first symbol on the video stream that it receives, which first symbol represents the landing zone, in order to cause both the stream and the symbol to be displayed on a first display. This first symbol is thus overlaid in the video stream displayed on the first display.

Thus, a pilot can see that there is an anomaly if the first symbol is not displayed on the intended landing zone.

This method thus makes it possible to have various means for verifying that the approach is taking place correctly. If an alarm is generated, or if the positioning of the first symbol displayed superposed on the real image is aberrant, the pilot is made aware of an anomaly.

Also, this method uses both a first imaging system that tracks the landing zone in order to obtain the position information, and also a second imaging system that serves to verify the calculations performed visually and by a correlation calculation. Furthermore, the first imaging system and the second imaging system are distinct, thereby tending to obtain a system that does not have a common mode of malfunctioning. The first imaging system and the second imaging system may make use of algorithms that are known from elsewhere and that are dissimilar in order to increase the reliability level of the system.

In particular, the first imaging system may make use of an algorithm for detecting the landing zone in the real image during the step of calculating position information, and the second imaging system may make use of a different algorithm for detecting the landing zone in the real image during the step of verifying that a landing zone is present in the real image positioned at the current position.

The method can thus be relatively robust, and can assist a pilot during a stage of flight that is usually complicated.

The method may include one or more of the following characteristics.

In one aspect, the current position of the landing zone may be expressed at least with relative data positioning the landing zone relative to the aircraft, the relative data being transmitted to the second imaging system.

The first display may operate in a mode referred to, for convenience, as a "relative" mode or relative word. Such a relative mode makes use of position information positioning the landing zone of the consolidated path relative to the aircraft. The relative data may comprise a bearing angle and an elevation angle together with a distance.

Conversely, a mode that may be referred to as an "absolute" mode or absolute word makes use of position information positioning the landing zone or the consolidated path in the Earth's reference frame, e.g. by using latitude and longitude.

In one aspect, if the current position of the landing zone varies between two successive calculation instants, the target position may be estimated by determining a travel speed vector for the landing zone by using the current positions determined during said successive calculation instants.

For example, the travel speed vector is estimated by estimating a north speed and an east speed of the landing zone being tracked.

The Kalman filter estimator can thus determine the target position, possibly by considering that the landing zone is moving at a speed that is constant, i.e. at a speed with zero acceleration.

In another aspect, the verification by the second imaging system that a landing zone is present at the current position may be performed in various ways.

In a first implementation, the method includes an analysis step of the second imaging system analyzing a portion of the real image including the current position in order to determine whether a landing zone is present in that portion, with an alarm being generated if no landing zone is detected in said portion of the real image.

The term "portion of the real image including the current position" designates a portion of the real image that includes a point positioned at the current position. For example, said portion may present predetermined dimensions and may be centered on the current position.

Under such circumstances, the second imaging system determines whether it identifies a landing zone at the current position. For this purpose, the second imaging system may use algorithms that differ from the algorithms used by the first imaging system for tracking the landing zone. For example, the second imaging system may evaluate whether said portion includes a shape that is characteristic of a landing zone, e.g. an H in a circle when visibility is sufficient, or a string of green lights at night or in foggy weather.

If not, the second imaging system issues a signal to generate an alarm.

The first implementation proposes using the second imaging system to verify that the real image does indeed present a landing zone at the current position as evaluated using position information coming from the first imaging system.

In a second implementation, the method comprises the steps of:

the second imaging system calculating an actual synthesized image representing the landing zone as seen from the aircraft at the current calculation instant as from said current position; and the second imaging system comparing said actual synthesized image with the real image.

Said alarm is generated when said actual synthesized image does not correspond to the landing zone present on the real image.

In one aspect, the actual synthesized image might not correspond to the landing zone present on the real image if there is a distance between the synthesized image and the real image that is greater than a predetermined accuracy threshold.

Coincidence between the predicted landing zone and the landing zone detected by the second imaging system can be confirmed by two distinct images that are thus considered as being similar providing the images are separated by a distance that is smaller than a threshold.

This second implementation proposes using the second imaging system to prepare a synthesized image of the landing zone that is said to be the "actual" synthesized image, and by comparing this actual synthesized image with the real image in order to verify that the actual synthesized image and the real image do indeed match.

Various different techniques can be used for evaluating the quality of such a match. By way of example, distances may be evaluated in a red, green, blue (R, G, B) color system between the points of the different images, a statistical function of the distances being compared with a threshold in order to generate an alarm, for example.

In one aspect, the method may comprise the following steps:

comparing said distance with a predetermined abandon threshold; and abandoning said approach if the distance exceeds said abandon threshold.

Non-correlation between the real and synthesized images may need to the autopilot system being disengaged. The abandon threshold may differ from the alarm generation threshold.

For example, the autopilot system may initially make use of highly visible signaling to signal a malfunction, such as flashing a light for 30 seconds, for example. Thereafter, the autopilot system may disengage itself, or may possibly switch over to some other piloting mode such as a ground speed piloting mode or an automatic hovering mode.

In one aspect, the second imaging system may prepare a synthesized representation of the consolidated path and the first display may display the synthesized representation.

The consolidated path may be in the form of tracer bullets in the video stream displayed on the first display. The consolidated path is then represented by a succession of spots, with each spot representing by way of example points that are to be reached by the aircraft in consecutive seconds.

In one aspect, the method may comprise the following steps:

the autopilot system transmitting to a second display both the consolidated path leading to the landing zone in the Earth's reference frame and also the current position expressed in the form of absolute coordinates in the Earth's reference frame; and displaying both said consolidated path and also a second symbol representing the landing zone positioned at said current position of the landing zone on said second display.

The absolute coordinates may be in the form of latitude and longitude.

Under such circumstances, and by way of example, the second imaging system may request the first display to present the landing zone and the consolidated path in the relative mode.

The autopilot system may request the second display to present the landing zone and the consolidated path in the absolute mode.

The landing zone and the consolidated path are thus displayed in two different modes in order to maximize the monitoring of the operation of the system.

The first display and the second display may comprise two respective dedicated screens, or they may represent two portions of a single screen. At least the second display may form part of a conventional navigation computer.

The method may include a step of the second display displaying at least one of the following elements: at least one predetermined waypoint of said consolidated path; a plot identifying an object having an AIS identification system; and at least one point representing an object detected by a radar system.

The acronym AIS stands for known automatic identification system. It is a system for automatically exchanging messages between vehicles and that serves to give the identity, the status, the position, and the route of each vehicle situated nearby.

The second display thus makes it possible to view the landing zone and the consolidated path displayed relative to other objects that are positioned by techniques that are completely different. If the displayed data does not correspond to the scene that is visible to a pilot, the pilot can deduce that there is a malfunction. The automatic guidance mode can then be interrupted in order to revert to manual piloting.

In one aspect, the step of activating the guidance mode may comprise the following steps:

a pilot selecting a landing zone from a proposal made by the first imaging system; and activating the guidance mode.

In this variant, a pilot can operate the first imaging system in order to select, on the first display, the landing zone that is to be reached. The guidance mode is then activated in order to reach this landing zone, with the method making it possible to refine the consolidated path while the aircraft is moving. The guidance mode may be activated by a specific action of a pilot on control means.

In another variant, the step of activating the guidance mode may comprise the following steps:

designating a landing sector;

activating the guidance mode in order to go towards said landing sector;

searching for a landing zone;

after detecting the landing zone, a pilot confirming the landing zone; and activating the guidance mode in order to go towards the landing zone.

The guidance mode is thus activated in order to reach a landing sector, and then to reach the landing zone once the landing zone has been identified.

Guidance can thus be engaged when the aircraft cannot distinguish the landing zone, but merely the outline of a platform, for example. In contrast, the pilot needs to take action subsequently in order to confirm the landing zone.

In addition to a method, the invention provides a piloting assistance system configured for implementing the method, the piloting assistance system comprising at least the first imaging system, the second imaging system, said at least one camera, the autopilot system, and the above-mentioned first display.

The piloting assistance system may comprise at least the following members: a second display; a database including at least one landing zone; and a selector for selecting a landing zone.

The invention also provides an aircraft provided with the piloting assistance system.

BRIEF DESCRIPTION OF THE DRAWINGS

The invention and its advantages appear in greater detail in the context of the following description of embodiments given by way of illustration and with reference to the accompanying figures, in which.

Elements that appear in more that one of the figures are given the same references in each of them.

DETAILED DESCRIPTION OF THE INVENTION

Figure 1:
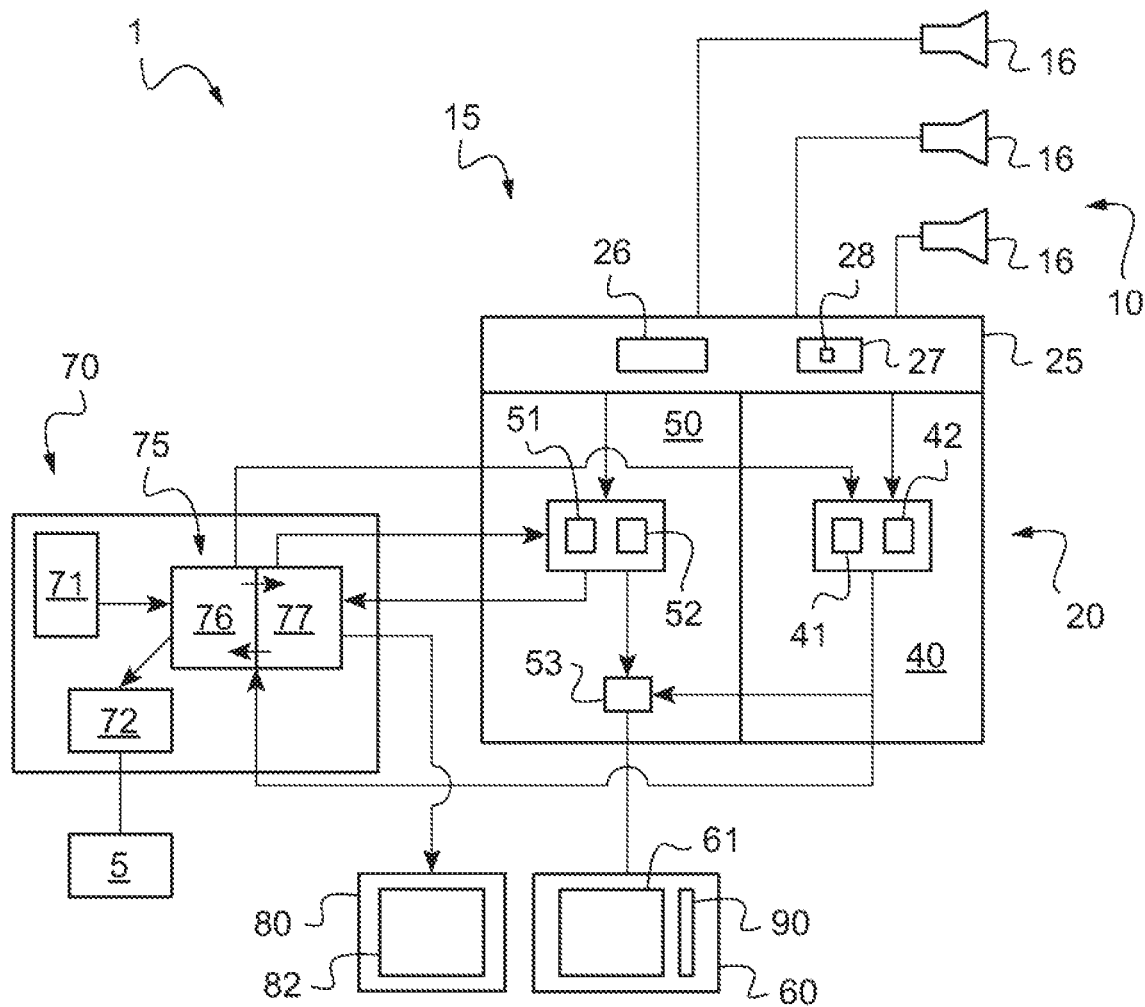
FIG. 1 is a diagram showing a piloting assistance system of the invention.

FIG. 1 shows an aircraft 1. The aircraft 1 is provided with movable control members 5 for directing the aircraft 1 in three-dimensional space. On a helicopter, the control members comprise rotor blades, in particular blades of a rotor contributing at least in part to providing the aircraft 1 with lift and possibly also propulsion. Control members 5 may also comprise flaps, e.g. arranged on or constituting a tailfin and/or a tailplane and/or a wing.

Furthermore, the aircraft 1 is provided with a piloting assistance system 10 of the invention. The piloting assistance system 10 includes an autopilot system 70 comprising a processor unit 75 together with conventional sensors 71 and actuators 72 suitable for causing the control members 5 to move. The processor unit 75 applies conventional methods to control the actuators 72 as a function of measurements taken by the sensors 71 in order to tend towards complying with a piloting setpoint.

Such sensors 71 can evaluate the current value of at least one flight state, such as at least one angular speed of the aircraft about an axis of a reference frame of the aircraft, a roll angle and a pitching angle of the aircraft 1, a heading followed by the aircraft 1, at least one acceleration of the aircraft 1 along an axis of the reference frame 2 of the aircraft, at least one speed of the aircraft along an axis of reference frame 2 of the aircraft, a geographical position of the aircraft in the Earth's reference frame, . . . . By way of example, the sensors 71 may comprise an inertial unit, a satellite positioning system, a radar system, an air data computer (ADC), a radio altimeter, . . . .

By way of example, the actuators 72 may comprise jacks, servocontrols, electric motors, . . . .

Under such circumstances, the processor unit 75 is connected by wired or wireless links to the sensors 71 and to the actuators 72. The processor unit may be a dual duplex unit provided with two processor subassemblies 76 and 77. Each processor subassembly 76, 77 may comprise at least a processor, a memory unit, an integrated circuit, a programmable system, and/or a logic circuit, these examples not limiting the scope to be given to the term "processor subassembly".

Furthermore, the piloting assistance system 10 includes a video acquisition system 15 and an imaging device 20. The video acquisition system 15 has at least one camera 16. For example, the video acquisition system 15 may include a first camera having a long focal length with a narrow field of 5° by 3.5° and a resolution of 14 million pixels, a second camera having a field of 30° by 20°, and a wide-angle third camera having a field of about 110°.

The imaging device may be in the form of an imaging computer. The imaging computer may comprise a processor card 25 connected to the cameras and possibly representing a computer unit of the video acquisition system. The processor card 25 may be an electronic card.

Furthermore, the imaging device includes a first imaging system 40 and a second imaging system 50, each connected to the processor card.

Under such circumstances, the cameras 16 deliver video streams that are transmitted to the processor card 25. The processor card 25 performs conventional processing, e.g. color processing, in order to generate a stream of images that are transmitted to the first imaging system 40 and to the second imaging system 50. Under such circumstances, the video acquisition system 15 captures an image stream transmitted to the first imaging system 40 and to the second imaging system 50, possibly directly or else via the processor card 25.

By way of example, each of the first imaging system 40 and the second imaging system 50 may be in the form of a graphics card of the imaging computer. Under such circumstances, the first imaging system 40 and the second imaging system 50 represent two independent calculation channels of the imaging computer.

The first imaging system 40 and the second imaging system 50, and possibly also the processor card 25, may each comprise at least one processor 41, 51, 26 and at least a memory unit 42, 52, 27, an integrated circuit, a programmable system, and/or a logic circuit, these examples not limiting the scope to be given to the term "imaging system" and to the term "processor card".

Furthermore, the first imaging system 40 is connected via a wired or wireless link to the second imaging system 50, and for example to a video overlay system 53 serving to overlay a synthetic video image in a video stream. The video overlay system 53 may comprise at least a processor, a memory unit, an integrated circuit, a programmable system, and/or a logic circuit, these examples not limiting the scope to be given to the term "video overlay system" 53.

Furthermore, the first imaging system 40 is connected by at least one wired or wireless link to the autopilot system 70 of the aircraft, and in particular to the processor unit 75.

The second imaging system 50 is connected by a wired or wireless link to a first display 60, where appropriate, via the video overlay system 53. The first display 60 comprises a first screen 61 and a selector 90 operable by a pilot to request various actions. For example, the first screen is a touch-screen 62 including the selector.

The second imaging system 50 is also connected by at least one wired or wireless link to the autopilot system 70, and in particular to the processor unit 75.

Furthermore, the piloting assistance system 10 may include a second display 80 connected via at least one wired or wireless link to the autopilot system 70, and in particular to the processor unit 75. The second display 80 may be in the form of a dedicated display or indeed, by way of example, it may be a conventional navigation computer adapted to apply the method of the invention. The second display 80 includes at least one second screen 82. Optionally, the first display and the second display are two portions of the same piece of equipment, the first screen and the second screen forming two superposed screens.

In another aspect, the imaging device may include a database 28 storing various landing zones, e.g. platforms. The database is optionally stored in a memory unit 27 of the processor card 25.

Such a piloting assistance system 10 serves to apply the method of the invention.

In this method, a pilot acts in a selection step to select a landing zone on which the pilot seeks to land. Under such circumstances, the pilot activates an automatic guidance mode in order to reach the landing zone automatically by following a consolidated path having predefined characteristics.

The term "pilot" should be understood broadly, and it thus designates not only the pilot proper but also where appropriate, a crew member on board the aircraft.

In a first variant, the imaging device proposes a selection of landing zones to the pilot by applying known techniques. For example, the landing zones are presented on the first display, with the pilot using the selector 90 in order to select one landing zone.

Once a landing zone has been selected, the pilot may activate the automatic guidance mode.

In order to select a landing zone, the available landing zones may be extracted from the database 28.

In an alternative method, the first imaging system 40 may process the stream of images generated by the cameras in order to identify landing zones while they are far away, and display them on a screen, e.g. the screen of the first display.

It is possible to apply the teaching of documents EP 2 996 009, WO2014/169354, or of the patent application filed in France on Jul. 11, 2016 under the number 16/01076.

Initially, the first imaging system may process images of the image stream by detecting a horizon line by using a so-called "gradient" method. More precisely, such a method consists in using a vertical "Sobel" filter on an image. Such a method thus serves to amplify contrast and to detect horizontal lines. Thereafter, the first imaging system searches within the image for the straight line passing through the largest number of points by using a "Hough" transform. In practice, the horizon line in the image is not exactly a straight line, but rather an arc of a parabola.

Nevertheless, detecting the horizon line approximately is not troublesome, since detecting the horizon line serves only to eliminate the top portion of the image that corresponds to the sky and that is not useful for detecting landing zones.

It is possible to envisage other methods for segmenting the image in order to eliminate the sea and the sky, and retain only those zones that appear to include an object of the platform, ship, etc. . . . type.

Furthermore, the first imaging system takes account of the angle of inclination of the rotorcraft about its roll axis by means of the sensor 71 serving to give the attitude of the rotorcraft at all times, thus making it possible to determine the angle of rotation that makes it possible to right the image that corresponds to the horizontal attitude angles of the rotorcraft.

Once the horizon line has been identified and the sky eliminated, the first imaging system performs a so-called "by region" method as described for another application in a publication by Arnaud Le Troter, Sébastien Mavromatis, and Jean Sequeira, entitled "Soccer field detection in video images using color and spatial coherence—International Conference on Image Analysis and Recognition Porto, Portugal, October 2004"

Such a by region method then makes it possible to search for dominant colors in an image or a zone of interest by color distribution. That method also makes it possible to search for image zones that present color coherence, and then it makes use of an enlargement model on the pixels of the image. Such a model is known for recognizing color pixels making up images and can make use of a color representation space such as that known as hue, saturation, lightness (HSL).

Such a method by region makes it possible in particular to detect the sea in a low portion of the image lying below the horizon line, and the sky in the high portion of the image and arranged above the horizon line.

Thereafter, grouping the remaining pixels together in connected zones ("connexes zones" in French) makes it possible to obtain zones having one or more looked-for landing zones. Any connected zones that are present in the sky only are removed, since they generally correspond to clouds, smoke, and flying objects, and do not correspond to looked-for landing zones.

Coherent zones are formed by allocating an "HSL" zone to each pixel, or else an absence of HSL zone whenever the color of the pixel does not lie in any of the dominant HSL zones (or dominant colors of the image). Thereafter, the first imaging system serves to create connected zones of pixels belonging to the same HSL zone.

The phenomenon of enlarging the pixel to a zone is performed by applying a mathematical morphology tool corresponding to a closure. The structuring element selected for closure is a circle of size that is much smaller than the minimum sizes for landing zones or sets of landing zones that are to be detected in the image. The size selected for the structuring element is of the order of one tenth the size of the objects to be detected.

The zones that are obtained are then identified as being capable of containing potential landing zones and they may be displayed independently by the display means and then selected by the crew.

Advantageously, the first display serves to display various images respectively representative of a plurality of types of landing zones to be looked for by the device, and the pre-selection means may be of the touch type and arranged directly on a display surface of the display member.

Thus, the display member serves to display an image that is representative of the looked-for landing zone(s), and the means for selecting the desired landing zone from among of the looked-for landing zone(s) may coincide therewith and be formed by a selection touchscreen.

Furthermore, the pre-selection touchscreen and the selection touchscreen may also coincide and be formed by a single touchscreen of the first display that serves initially to pre-select a type of landing zone to be looked for, secondly to display at least one identified landing zone corresponding to the pre-selected landing zone type, and finally, thirdly to select a desired landing zone.

In a second variant, a pilot may designate a landing sector and activate the guidance mode so as to go towards said landing sector. The landing sector may comprise a silhouette of a platform or of a vessel observed with the cameras, which silhouette may possibly not be sufficiently accurate to enable landing zones to be detected as such.

While the aircraft is moving, the imaging device, and in particular the first imaging system, may scan the landing sector, e.g. using the above-described method, in order to look for a landing zone. After detecting the landing zone, a pilot may confirm the selected landing zone and then activate the guidance mode in order to go towards the landing zone.

Furthermore, while the aircraft is moving, the video acquisition system 15 captures an image stream of the landing zone. This image stream is transmitted, where appropriate, by the processor card 25 to the first imaging system 40 and to the second imaging system 50. This image stream corresponds to a "real" image including the landing zone tracked at each calculation instant.

Under such circumstances, the first imaging system 40 evaluates position information of the landing zone from the real image, and possibly from at least one of the above-mentioned flight states. The position information serves to determine the position of the landing zone relative to the aircraft 1.

Figure 3:
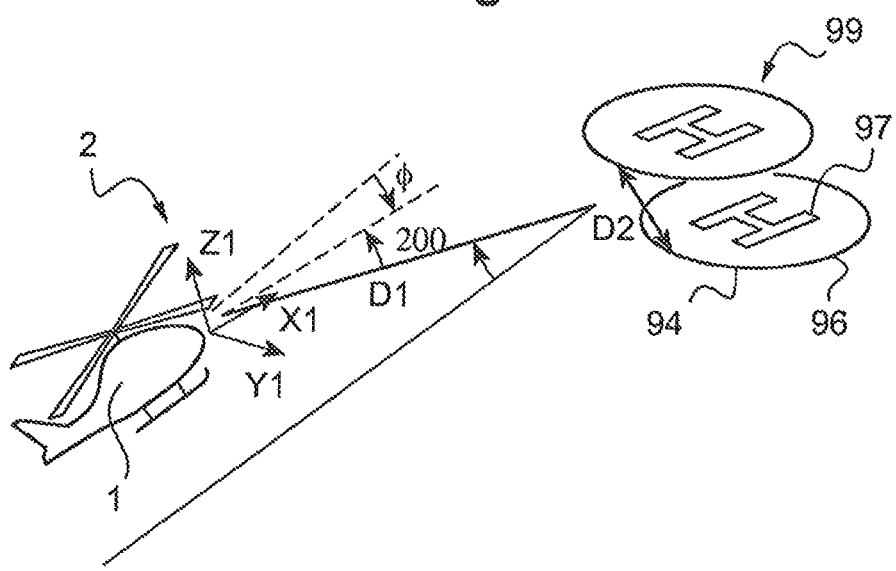
FIG. 3 is a diagram showing a comparison of one image with another image.

With reference to FIG. 3, the aircraft 1 is associated with a reference frame 2. The position information may then comprise an elevation angle 200 and a bearing angle $\Phi$ to a geometrical center of the landing zone, together with a distance D1 between the aircraft 1 and the landing zone.

By way of illustration, and when a landing zone is represented on the ground by a circle, the thickness of the line forming the circumference of the circle may be standardised to be equal to 1 meter (m) in compliance with the requirements of "CAP 437—Standards for Offshore Helicopter Landing Areas". For other landing zones, it is possible to define other categories of landing zones as a function of the thickness of the circle, square, or the triangle marking a landing zone on the ground or on a support. Depending on the type of landing zone that is pre-selected, it is possible for the calculation means to use a different algorithm.

Also, when a landing zone is marked by a predetermined circle, and by using the bearing angle $\Phi$ at which the camera(s) see(s) the diameter of the circle, it is possible to calculate the distance D1 to the center of the landing zone. The shape of the landing zone seen by each camera is an ellipse corresponding to the deformed shape of the circle as seen by the camera(s) and identified in the images, for which it is possible to calculate the equations.

Using the small angles approximation, this gives:

$$D1 = \frac{e}{\Phi}$$

where e is the diameter of the outline of the landing zone that is of the order of 10 m. The value $\Phi$ represents the angle at which the diameter of the landing zone is seen, and it can be calculated on the basis of projective geometry, in particular by using an approximation of the pinhole camera model. The pinhole model consists in assuming that all of the light rays pass through a single point (called a "pinhole") and are projected onto the plane on which the image is captured. The distance between the point and the plane is referred to as the "focal length" f.

In accordance with the pinhole model, the point where the rays meet is defined as the origin of the rectangular reference frame for three-dimensional space with a z-axis that is the axis orthogonal to the image plane and going in the opposite direction to the image.

The point having the coordinates (x,y,z) is projected onto the image plane (x',y',z') with:

$$x' = x * \frac{f}{z}, \quad y' = y * \frac{f}{z}, \quad z' = f.$$

The angle at which an object is seen corresponds to the size of the object on the image plane divided by the focal length. This approximation is valid for small angles. In practice, the size of the image is defined by a number of pixels: it is therefore necessary to multiply it by a coefficient of proportionality for converting between angles and pixels.

The device then reproduces a scene, of characteristics that are known. Thus, by means of a camera, the scene is captured, and the images that are obtained serve to calculate the coefficients of proportionality.

Thereafter, data about the rotorcraft, such as its attitude and the position of the camera serve to identify the elevation angle 200 at which the landing zone is seen, which elevation angle 200 is the difference between the attitude of the aircraft itself and the elevation angle of the camera relative to the aircraft.

The calculation means begin by turning the image taken by the camera through an angle that is the opposite of the roll angle of the rotorcraft in order to right the image.

Thereafter, the angle 200 is calculated initially by taking the difference between the pitching angle of the rotorcraft as provided by on-board instruments and the angle between the line of sight of the camera and a longitudinal axis of the rotorcraft (a value that is constant if the camera is stationary relative to the aircraft, otherwise if it is variable, it may be transmitted to the calculation means by the camera system). The angle 200 is then calculated by adding this sum to an angle measured on the image. This angle measured from the image corresponds to the angle between the line of sight of the camera and the line passing through the camera and the center of the landing zone. This angle measured on the image is thus obtained from data supplied by the camera serving to define an angle from pixels and the distance in pixels between the center of the landing zone and the line of sight of the camera.

Furthermore, landing zones satisfying the CAP437 standard are circular in shape 96 with an H 97 in the center. When rotorcraft are far from the vertical axis passing through the center of such landing zones, the landing zones are seen to be elliptical in shape and they may be characterized by a reduced equation in a rectangular reference frame having the form:

$$\frac{((x\cos\theta 1 + y\sin\theta 1) - x_E)^2}{a^2} + \frac{((-x\sin\theta 1 + y\cos\theta 1) - y_E)^2}{b^2} = 1$$

where $E(x_E, y_E)$ is the center of the ellipse, $\theta 1$ is the orientation of the ellipse, a is the half major axis, and b is the half minor axis. Thus, in order to characterize any ellipse, the calculation means serve to determine these five parameters.

Document U.S. Pat. No. 4,618,989 gives an embodiment of means for extracting ellipse parameters from an image.

In this context, the first imaging system continuously delivers determined positioning information to the autopilot system 70.

Furthermore, the first imaging system 40 can send the received video stream to the second imaging system 50, and in particular to the video overlay system 53.

The first imaging system 40 is thus used to track the landing zone in order to determine its position relative to the aircraft.

This position is then used by the autopilot system 70.

Under such circumstances, the processing unit 75 determines a "current" position of the target landing zone by injecting position information into a Kalman filter estimator.

This current position may be expressed in the form of a relative position specified relative to the aircraft, e.g. via an elevation angle, a bearing angle, and a distance. In addition, or as an alternative, this current position may be expressed in the form of an absolute position, e.g. in the form of a latitude and longitude of a characteristic point of the zone, such as its geometrical center, for example.

Furthermore, the processor system 75 determines a "target" position of the landing zone to be reached by the landing zone when the aircraft 1 lands on the landing zone. The target position is thus a predicted position in which the landing zone is going to be found on landing.

Figure 4:
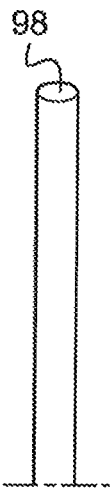
FIG. 4 is a diagram showing a moving landing zone.
Figure 4:
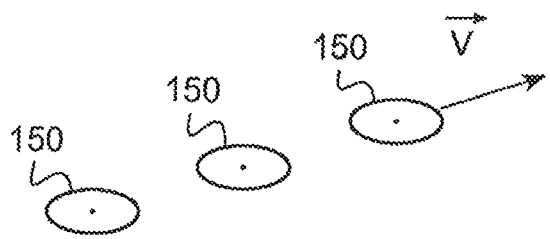

With reference to FIG. 4, if the current position of the landing zone varies between two successive calculation points 150, the target position may be evaluated by evaluating a travel speed vector of the landing zone between the current positions as determined during said successive calculation points.

In addition, and with reference to FIG. 1, the processor unit 75 determines a "consolidated" path leading towards the current position of the landing zone, and where appropriate towards the target position, by applying at least one stored approach model.

Under such circumstances, the processor unit 75 delivers continuously in particular the current position and the consolidated path to the second imaging system 50 in order to inform the crew of any malfunction. Optionally, the processing unit also transmits to the first imaging system the flight state values that it needs in order to operate.

Under such circumstances, the second imaging system 50 determines whether the real image presents the appropriate landing zone at the current position.

In a first embodiment, the second imaging system 50 scans a portion of the real image positioned around the current position, making use of image processing methods that may optionally be conventional and/or different from the methods used by the first imaging system. In particular, the second imaging system 50 processes this portion of the real image in order to determine whether a landing zone is present in this portion.

If not, an alarm is generated.

The second imaging system 50 thus evaluates the presence of a landing zone at the location predicted by the autopilot system.

In a second embodiment, the second imaging system 50 calculates an "actual" synthesized image showing the landing zone as seen from the aircraft 1 at the current calculation instant. In order to prepare this synthesized image, the second imaging system 50 takes into consideration the stored shape of the landing zone and deforms it as a function of the current position. By way of example, and assuming that the landing zone comprises a circle 96, the second imaging system 50 determines the ellipse as seen from the aircraft using conventional mathematical methods.

As time passes, the second imaging system 50 thus determines a succession of actual synthesized images.

Furthermore, at each calculation instant, the second imaging system 50 compares the actual synthesized image with the real image as received from elsewhere.

For this purpose, and with reference to FIG. 3, the second imaging system 50 can determine the value of a distance D2 between the synthesized image 99 and the real image 94. If this distance D2 is less than an accuracy threshold defined by the manufacturer, the second imaging system 50 considers that the synthesized image 99 and the real image 94 correspond to each other.

If not, the second imaging system 50 generates an alarm.

Optionally, and in the second embodiment, the second imaging system 50 may also compare the distance D2 with an abandon threshold that is defined by the manufacturer, the abandon threshold being greater than the accuracy threshold.

If the distance D2 exceeds the abandon threshold, the piloting assistance system may terminate the guidance mode that is automatically guiding the aircraft along the consolidated path.

The second imaging system 50 thus evaluates the matching between the succession of synthesized images and the real images received from the cameras. By means of algorithms that may possibly be different from those used by the first imaging system for identifying the relative position and the angle at which the particular looked-for marking 96, 97 is to be found, the second imaging system 50 verifies that matching is very good at the landing zone 64 that is being acquired by the autopilot system.

Furthermore, the second imaging system 50 can verify that the matching is very poor everywhere else.

Specifically, the surroundings of a landing zone might include structures presenting shapes that could be taken as constituting a landing zone. For example, a chimney 98 may present such a shape by having an end that is elliptical in shape, like a landing zone seen from a distance.

The second imaging system 50 can verify whether matching between such a structure and the landing zone is reliable.

Independently of the embodiment, the alarm that might be issued may take the form of a low confidence index being transmitted to the processor unit 75. This processor unit 75 makes use of an alert system for informing a pilot of a malfunction, by means of an alert that may for example be textual, visual, and/or audible, and/or tactile.

In another aspect, the second imaging system 50 superposes a first symbol on the stream of real images, which first symbol is positioned at said current position of the landing zone as generated by the second imaging system 50. The second imaging system 50 then transmits to the first display 60 a stream of images coming from the cameras and having the first symbol overlaid therein as time passes.

In the context of the second embodiment, the first symbol may be in the form of the actual synthesized image, or it may be in some other form.

Whatever embodiment, the first symbol may comprise a plurality of converging segments. By way of example, four segments may form a cross. Under such circumstances, and with reference to FIG. 2, the first display 60 displays the real image 94 and a first symbol 65 positioned at the current position for visual comparison by a pilot. The first symbol may be generated by using a current position expressed in the form of relative data.

A first symbol in the form of a cross presents the advantage of optionally enabling a pilot to see the landing zone 64.

In another aspect, the second imaging system 50 can prepare a synthesized representation 67 of the consolidated path 66.

Specifically, the consolidated path prepared by the autopilot system may comprise a succession of simple mathematical shapes 68, such as straight line segments, parabola portions, . . . . Under such circumstances, the autopilot system may compress the consolidated path on this basis by using a small amount of data for each portion. For example, the consolidated path may be made up of a straight line segment expressed using a plurality of parameters, a segment of a parabola expressed using a plurality of parameters, . . . .

The second imaging system 50 decompresses this data in order to obtain the consolidated path. The second imaging system 50 then prepares a synthesized representation 67 of the consolidated path 66 and incorporated in the video image stream.

When the consolidated path seeks to join a moving landing zone, it is possible for the consolidated path not to terminate on the landing zone that can be seen on the first display, as in the example shown.

Figure 2:
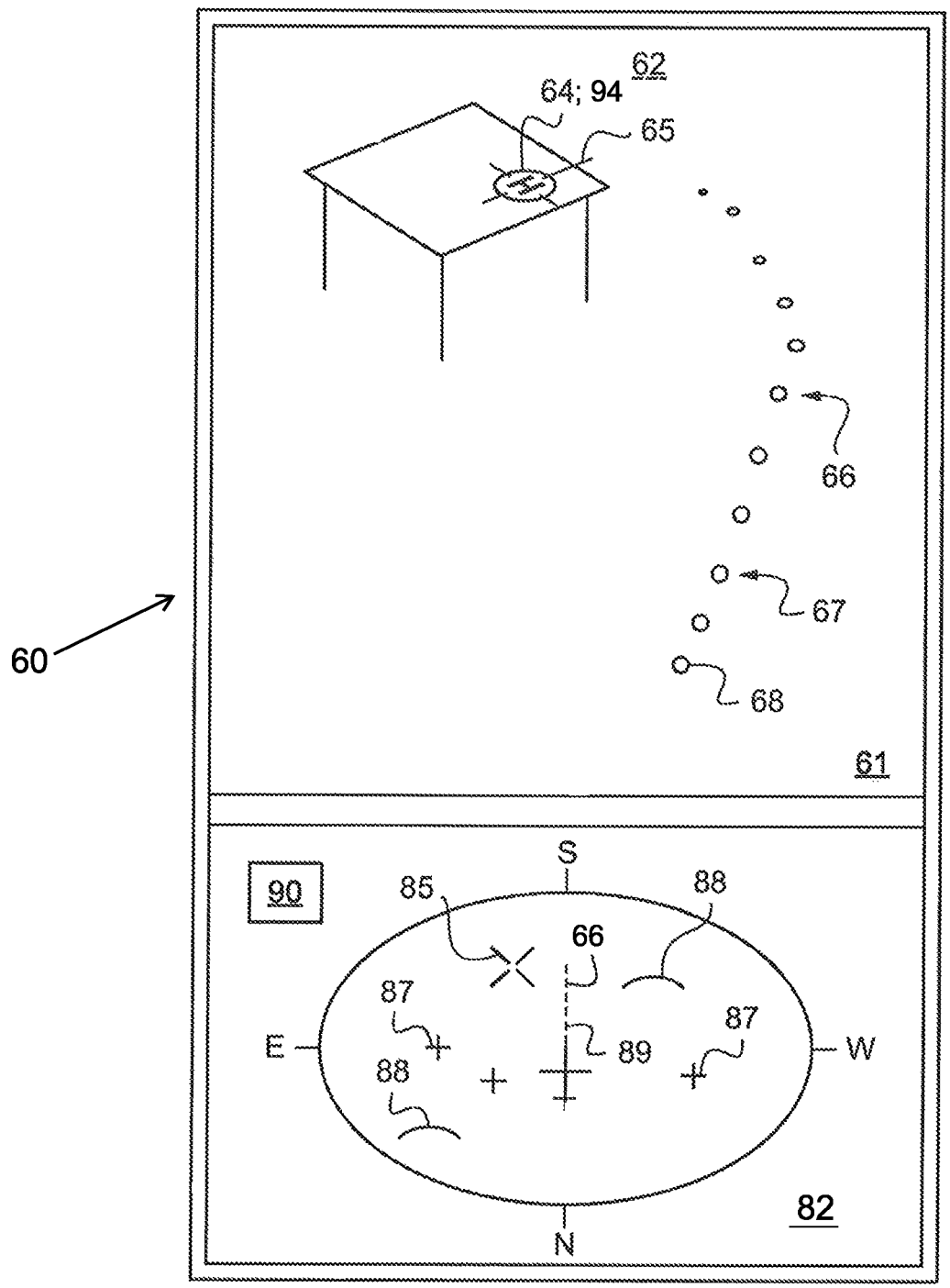
FIG. 2 is a diagram showing a first display and a second display.

FIG. 2 shows a synthesized representation that is in the form of tracer bullets.

In another aspect, the autopilot system 70 may also transmit the consolidated path 66 and the current position to a second display 80. In contrast, the consolidated path 66 and the current position are expressed in the form of absolute coordinates in the Earth's reference frame.

Under such circumstances, the second display 80 displays the consolidated path 66 and a second symbol 85 representing the landing zone positioned at the current position.

Consequently, the first display 60 displays a representation of the landing zone and the consolidated path followed in a relative world using relative data, while the second display 80 displays a representation of the landing zone and the consolidated path followed in an absolute world using absolute coordinates.

This absolute world is shown as seen from above on the second display. Under such circumstances, the consolidated path is substantially rectilinear.

Also, the second display 80 may display in conventional manner at least one of the following pieces of data: at least one predetermined waypoint 89 of the consolidated path 66, a plot 87 identifying an object that has an AIS identification system, and at least one point 88 representing an object detected by a radar system.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. A piloting assistance method for facilitating landing an aircraft on a landing zone, the method including a selection step for selecting the landing zone on which the aircraft is to land;

wherein the method comprises the following steps:
  activating a guidance mode of an autopilot system in order to guide the aircraft automatically along a consolidated path towards the landing zone during an approach;
  capturing, while the aircraft is flying along the consolidated path towards the landing zone during the approach, a stream of images of the landing zone with a video acquisition system comprising at least one camera, and transmitting the stream of images to a first imaging system and to a second imaging system, the first imaging system and the second imaging system being independent of one another to thereby avoid having a common mode of malfunctioning, the stream of images including a real image of the landing zone at a current calculation instant whereby the real image transmitted with the stream of images to the first imaging system and the second imaging system is the same image;
  processing the real image by the first imaging system for calculating, from the real image as processed by and only with the first imaging system, position information defining a relative position of the landing zone relative to the aircraft on the basis at least of the real image, and transmitting the position information from the first imaging system to the autopilot system;

determining with the autopilot system:
  a current position of the landing zone at the current calculation instant by injecting the position information into a Kalman filter estimator; and
  a target position of the landing zone that is to be reached by the landing zone when the aircraft lands on the landing zone, with the target position being determined using the Kalman filter estimator;

updating with the autopilot system the consolidated path to lead to the target position of the landing zone, wherein the consolidated path is updated as a function of at least one stored approach model;

transmitting at least the determined current position of the landing zone and the consolidated path from the autopilot system to the second imaging system;

processing the real image by the second imaging system for verifying from the real image as processed by and only with the second imaging system that a landing zone is present at the determined current position of the landing zone in the real image;

generating an alarm if such presence is not found; and displaying on a first display, with the second imaging system, the real image and a first symbol, representing the landing zone, positioned at the determined current position of the landing zone for visual comparison by a pilot.

2. The method according to claim 1, wherein the current position is expressed at least with relative data positioning the landing zone relative to the aircraft, the relative data being transmitted to the second imaging system.

3. The method according to claim 1, wherein if the current position varies between two successive calculation instants, the target position is estimated by determining a travel speed vector for the landing zone by using the current positions determined during the two successive calculation instants.

4. The method according to claim 1, wherein the verification by the second imaging system that a landing zone is present at the current position includes an analysis step of the second imaging system analyzing a portion of the real image including the current position in order to determine whether a landing zone is present in that portion, with an alarm being generated if no landing zone is detected in that portion of the real image.

5. The method according to claim 1, wherein the verification by the second imaging system that a landing zone is present at the current position comprises the steps of:
  calculating with the second imaging system an actual synthesized image representing the landing zone as seen from the aircraft at the current calculation instant as from the current position; and
  comparing with the second imaging system the actual synthesized image with the real image;
  the alarm being generated when the actual synthesized image does not correspond to the landing zone present on the real image.

6. The method according to claim 5, wherein the actual synthesized image does not correspond to the landing zone present on the real image if a distance (D2) between the synthesized image and the real image is greater than a predetermined accuracy threshold.

7. The method according to claim 6, comprising the following steps:
  comparing the distance (D2) with a predetermined abandon threshold; and
  abandoning the approach if the distance (D2) exceeds the abandon threshold.

8. The method according to claim 1, wherein the second imaging system prepares a synthesized representation of the consolidated path, and the first display displays the synthesized representation.

9. The method according to claim 1, comprising the following steps:
  transmitting by the autopilot system to a second display both the consolidated path leading to the landing zone in the Earth's reference frame and also the current position expressed in the form of absolute coordinates in the Earth's reference frame; and
  displaying both the consolidated path and also a second symbol representing the landing zone positioned at the current position on the second display.

10. The method according to claim 9, wherein the method includes a step of the second display displaying at least one of the following elements: at least one predetermined waypoint of the consolidated path; a plot identifying an object having an automatic identification system (AIS); and at least one point representing an object detected by a radar system.

11. The method according to claim 1, wherein the step of activating the guidance mode comprises the following steps:
  a pilot selecting a landing zone from a proposal made by the first imaging system; and
  activating the guidance mode.

12. The method according to claim 1, wherein the step of activating the guidance mode comprises the following steps:
  designating a landing sector;
  activating the guidance mode in order to go towards the landing sector;
  searching for a landing zone;
  after detecting the landing zone, a pilot confirming the landing zone; and
  activating the guidance mode in order to go towards the landing zone.

13. The method according to claim 1, wherein:
  the step of processing the real image by the first imaging system for calculating the relative position of the landing zone relative to the aircraft involves processing the real image with a first imaging processing algorithm to detect the landing zone in the real image; and
  the step of processing the real image by the second imaging system for verifying that a landing zone is present at the determined current position of the landing zone in the real image involves processing the real image with a second imaging processing algorithm different than the first imaging processing algorithm to detect the landing zone in the real image.

14. The method according to claim 1, wherein:
  the position information defining a relative position of the landing zone relative to the aircraft includes at least one of a bearing angle for the landing zone relative to the aircraft, an elevation angle for the landing zone relative to the aircraft, and a distance between the landing zone and the aircraft.

15. A piloting assistance system for facilitating landing an aircraft on a landing zone, the piloting assistance system comprising:
  an autopilot system configured to guide the aircraft automatically along a consolidated path towards the landing zone during an approach;
  a first imaging system and a second imaging system, the first imaging system and the second imaging system being independent of one another to thereby avoid having a common mode of malfunctioning;
a first display;
a video acquisition system configured to capture a stream of images of the landing zone using at least one camera and to transmit the stream of images to the first imaging system and to the second imaging system, the stream of images including a real image of the landing zone at a current calculation instant whereby the real image transmitted with the stream of images to the first imaging system and the second imaging system is the same image;
wherein the first imaging system is configured to process the real image to calculate, from the real image as processed by and only with the first imaging system, position information defining a relative position of the landing zone relative to the aircraft on the basis at least of the real image, the first imaging system is further configured to transmit the position information to the autopilot system;
the autopilot system is further configured to determine:
a current position of the landing zone at the current calculation instant by injecting the position information into a Kalman filter estimator; and
a target position of the landing zone that is to be reached by the landing zone when the aircraft lands on this landing zone, with this target position being determined using the Kalman filter estimator;
the autopilot system is further configured to update the consolidated path to lead to the target position of the landing zone, wherein the consolidated path is updated as a function of at least one stored approach model;
the autopilot system is further configured to transmit at least the determined current position of the landing zone and the consolidated path to the second imaging system;
the second imaging system is configured to process the real image to verify from the real image as processed by and only with the second imaging system that a landing zone is present at the determined current position of the landing zone in the real image; and
the second imaging system is further configured to generate an alarm if such presence is not found, and display on the first display the real image and a first symbol, representing the landing zone, positioned at the determined current position of the landing zone for visual comparison by a pilot.

16. The piloting assistance system according to claim 15, wherein the piloting assistance system comprises at least one of the following members: a second display; a database including at least one landing zone; and a selector for selecting a landing zone.

17. The piloting assistance system according to claim 15, wherein:
the first imaging system is further configured to process the real image with a first imaging processing algorithm to detect the landing zone in the real image in order to calculate the relative position of the landing zone relative to the aircraft on the basis at least of the real image; and
the second imaging system is further configured to process the real image with a second imaging processing algorithm different than the first imaging processing algorithm to detect the landing zone in the real image in order to verify that a landing zone is present at the determined current position of the landing zone in the real image.

18. The piloting assistance system according to claim 15, wherein:
the position information defining a relative position of the landing zone relative to the aircraft includes at least one of a bearing angle for the landing zone relative to the aircraft, an elevation angle for the landing zone relative to the aircraft, and a distance between the landing zone and the aircraft.

19. An aircraft comprising:
a piloting assistance system for facilitating landing the aircraft on a landing zone, the piloting assistance system including an autopilot system, a first imaging system and a second imaging system, a first display, and a video acquisition system, the first imaging system and the second imaging system being independent of one another to thereby avoid having a common mode of malfunctioning;
wherein the autopilot system is configured to guide the aircraft automatically along a consolidated path towards the landing zone during an approach;
the video acquisition system is configured to capture a stream of images of the landing zone using at least one camera and to transmit the stream of images to the first imaging system and to the second imaging system, the stream of images including a real image of the landing zone at a current calculation instant whereby the real image transmitted with the stream of images to the first imaging system and the second imaging system is the same image;
the first imaging system is configured to process the real image to calculate, from the real image as processed by and only with the first imaging system, position information defining a relative position of the landing zone relative to the aircraft on the basis at least of the real image, the first imaging system is further configured to transmit the position information to the autopilot system;
the autopilot system is further configured to determine:
a current position of the landing zone at the current calculation instant by injecting the position information into a Kalman filter estimator; and
a target position of the landing zone that is to be reached by the landing zone when the aircraft lands on this landing zone, with this target position being determined using the Kalman filter estimator;
the autopilot system is further configured to update the consolidated path to lead to the target position of the landing zone, wherein the consolidated path is updated as a function of at least one stored approach model;
the autopilot system is further configured to transmit at least the determined current position of the landing zone and the consolidated path to the second imaging system;
the second imaging system is configured to process the real image to verify from the real image as processed by and only with the second imaging system that a landing zone is present at the determined current position of the landing zone in the real image; and
the second imaging system is further configured to generate an alarm if such presence is not found, and display on the first display the real image and a first symbol, representing the landing zone, positioned at the determined current position of the landing zone for visual comparison by a pilot.

20. The aircraft of claim 19, wherein:
the first imaging system is further configured to process the real image with a first imaging processing algorithm to detect the landing zone in the real image in order to calculate the relative position of the landing zone relative to the aircraft on the basis at least of the real image; and the second imaging system is further configured to process the real image with a second imaging processing algorithm different than the first imaging processing algorithm to detect the landing zone in the real image in order to verify that a landing zone is present at the determined current position of the landing zone in the real image.

* * * * *